United States Patent [19]

Kraus

[11] 4,398,778
[45] Aug. 16, 1983

[54] BALL BEARING
[75] Inventor: Charles E. Kraus, Austin, Tex.
[73] Assignee: Excelermatic Inc., Austin, Tex.
[21] Appl. No.: 246,862
[22] Filed: Mar. 23, 1981

Related U.S. Application Data

[63] Continuation-in-part of Ser. No. 205,736, Nov. 10, 1980, abandoned.

[51] Int. Cl.$^3$ .............................................. F16C 33/58
[52] U.S. Cl. ..................................... 308/235; 308/219
[58] Field of Search ............... 308/235, 219, 233, 231, 308/232, 227

[56] References Cited

U.S. PATENT DOCUMENTS

| | | | |
|---|---|---|---|
| 518,321 | 4/1894 | LaCasse | 308/235 |
| 832,427 | 10/1906 | Sisson | 308/196 |
| 932,144 | 8/1909 | LaCasse | 308/235 |
| 1,423,666 | 7/1922 | Langhaar | 308/235 |
| 3,486,391 | 12/1969 | Kraus | 74/200 |
| 3,586,396 | 6/1971 | Barr | 308/6 R |
| 3,788,713 | 1/1974 | Kraus | |
| 4,086,820 | 5/1978 | Kraus et al. | 74/200 |
| 4,215,906 | 8/1980 | Speicher | 308/235 |

Primary Examiner—Lenard A. Footland
Attorney, Agent, or Firm—Klaus J. Bach

[57] ABSTRACT

An axial thrust bearing includes two race rings with opposed race surfaces defining a ball cavity and balls disposed in the ball cavity for rotatably supporting the race rings relative to each other. At least one of the race surfaces has annular raised areas which provide for rolling contact areas for the balls, the annular contact areas of the races being arranged in low speed bearings such that the apexes of the cones defined by the annular contact areas coincide on the axis of the bearing.

In high speed bearings the races are arranged so that secants through the ball and race contact points form an angle with a plane normal to the bearing axis, which angle is between 40 and 20% of an ideal angle at which the secants intersect on the bearing axis.

With this arrangement two rolling contact areas are provided by the respective race which increases load capacity and life of the respective race and reduces friction.

5 Claims, 12 Drawing Figures

BALL BEARING

This application is a continuation-in-part application of applicant's application Ser. No. 205,736 filed Nov. 10, 1980, abandoned and assigned to Excelomatic Inc.

BACKGROUND OF THE INVENTION

1. Field of the Invention

The present invention relates to axial thrust ball bearings in which at least one of the bearing races has two annular raised areas providing for rolling contact for the bearing balls, and to traction roller transmissions including such ball bearings.

2. Description of the Prior Art

A ball bearing consists of two races which form therebetween an annular cavity receiving the bearing balls. Upon rotation of the two races relative to each other the balls roll along the races while transmitting any load between the races with only rolling friction. To keep the friction low, the curvature of the races in an intersecting plane which receives the axis of the races is slightly larger than the curvature of the balls so as to avoid spin. The width of such a circular contact area depends on the curvature difference between the balls and the races (conformity). Conformity is defined as the ratio of the ball radius to the radius of curvature of the bearing cavity and is in the range of 0.95 to 0.97 for most bearings. With close conformity between balls and races the contact area, which, on a flat surface, would be a small circular area, becomes an elongated elliptical area. Since this elliptical area is however also curved along its main axis the internal frictional losses are quite appreciable.

If, on the other hand, there is no close conformity between balls and races there is little friction but the surface pressure in the contact circle area is greater and bearing life may be shorter. The balls are in contact with the races only along narrow circular lines along which the races are heavily loaded while other portions of the races bear little or no load.

In order to distribute the load over a larger area of the races and thereby permit larger loads for a given bearing size, at least one of the bearing races is so curved that it has two circular contact areas with the balls. This is obtained for example by providing on such race different surface areas whose centers of curvature are spaced from each other. The balls of such ball bearings contact the respective race along two lines of contact which reduces the contact pressures to one half and, consequently increases bearing life or permits higher bearing loads. There are bearings with three or four annular contact areas between the races and the bearing balls, as for example disclosed in U.S. Pat. Nos. 832,427 and 3,586,396. These bearings have high radial load capacity with low friction but axial load may cause spin on one or two of the annular contact areas which would result in rapid wear of the bearing.

In traction roller transmissions of the type described in U.S. Ser. No. 350,187 the traction rollers are exposed to high axial forces but the bearings supporting the rollers need to be relatively small since they are to be accommodated within the traction rollers. Bearings capable of supporting large axial loads are therefore required and bearings with more than only one pair of annular contact areas would be desirable.

SUMMARY OF THE INVENTION

In order to permit such bearings to be exposed to high axial loads but nevertheless be subjected only to little spin, the annular contact areas of each race ring are so arranged that the apexes of the cones defined by the annular contact areas of each of the race rings of such bearing coincide on the axis of the bearing, or, at least, are disposed in a predetermined relationship to each other. Practically no spin exists if the apexes coincide. But then bearing speed is limited since, at a predetermined speed centrifugal forces causes loss of contact at the inner ball contact areas. For high speed bearings, it has been found to be most effective if the apexes are spaced a certain distance such that the angle $\beta$ between the ball-race contact lines in an axial plane of the bearing is 60 to 80% of the "ideal" $\beta$ value at which the ball-race contact lines in the axial plane intersect on the axis of the bearing.

It has further been found that for application in axial thrust bearings, especially in connection with traction rollers of traction roller transmissions the bearings perform especially well when the contact areas between the rollers and a race are so formed that the angle $2\alpha$, that is the ball radii angle between the inner and outer contact circles of a race is between 32° and 44° or $\alpha$ is between 16° and 22°. Particularly suitable is an $\alpha$-angle of 18°-22°. In traction roller transmissions, such bearings substantially increase bearing life and consequently the life of the transmission.

DESCRIPTION OF THE PREFERRED EMBODIMENTS

Figure 1:
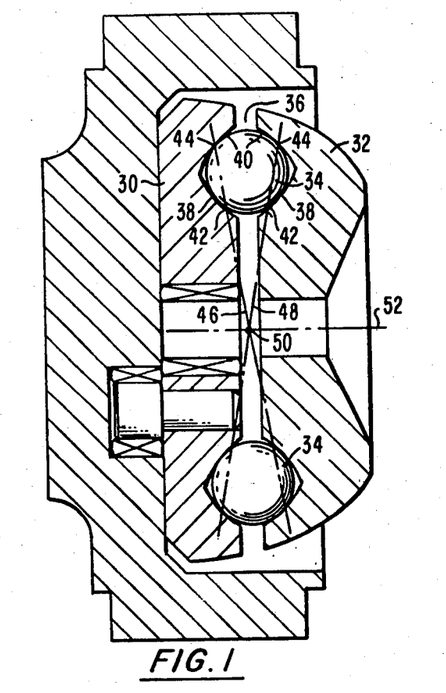
FIG. 1 shows an axial thrust bearing as used in connection with a traction roller of a traction roller transmission.

FIG. 1 shows an axial thrust bearing for a traction roller as used in traction roller transmissions of the type described in U.S. Ser. No. 350,187.

Figure 4:
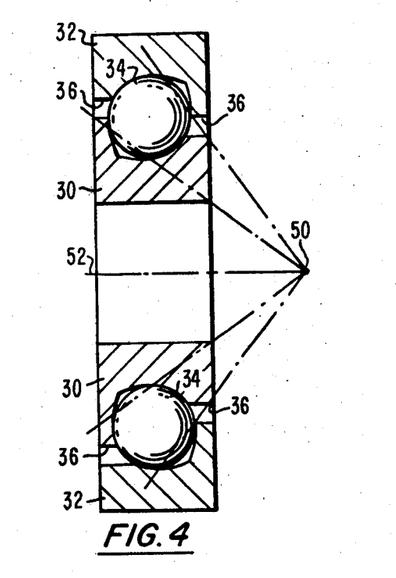
FIG. 4 shows an angle bearing incorporating the present invention.

The axial thrust bearing in accordance with the present invention has adjacent races 30 and 32 and bearing balls 34 disposed in an annular ball cavity 36. The ball cavity 36 between the adjacent races 30, 32 is formed by angled surface areas 38, 40 of relatively low ball conformity such that the balls 34 contact the angled surface ares 38, 40 along circles 42, 44. In order to avoid spin, the surface areas 38, 40 are so formed that their circles of contact 42, 44 with the bearing balls 34 are disposed in the surface of cones 46, 48 which have apexes 50 coinciding on the axis of rotation 52 of the races relative to each other. The apexes 50 may be disposed in the center plane between the two races or they may be displaced from the center plane on the axis 52 as indicated in FIG. 4.

Figure 2:
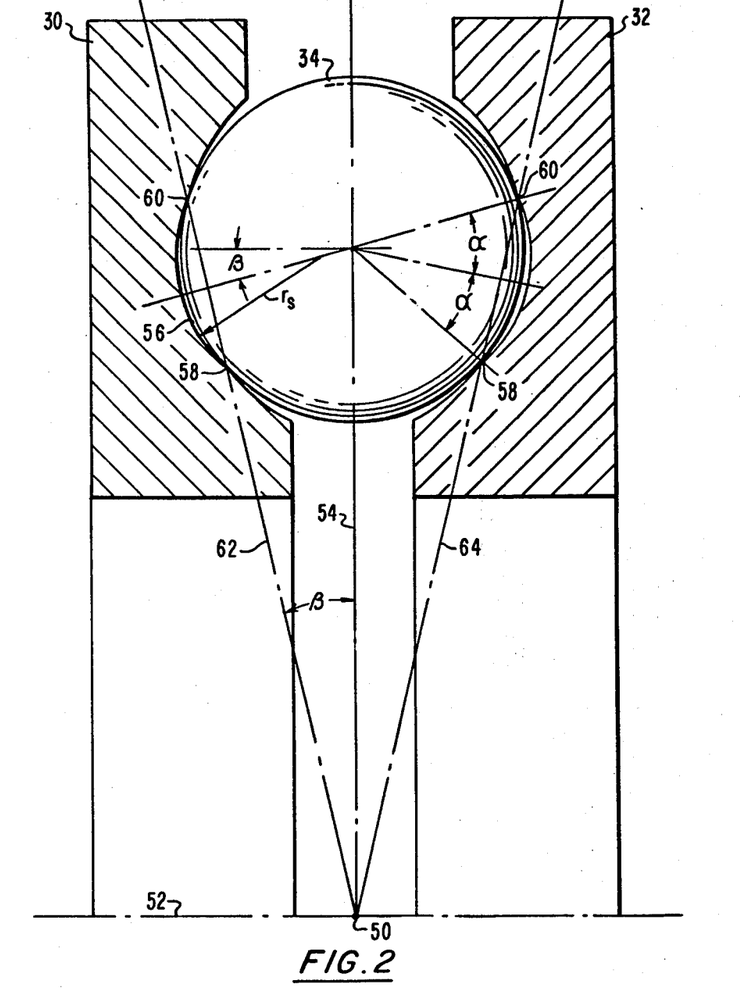
FIG. 2 shows in principle, one embodiment of the invention.

As shown in FIG. 2 where the ball rotational axis 54 is shown normal to the bearing axis 52, that is the apex 50 is in the center between the races 30 and 32, the two races 30 and 32 are identical. The race surfaces as shown in FIG. 2 are formed by first providing a roller cavity of normal radius corresponding to a ball radius divided by a selected conformity value. Then a cavity with a ratio smaller than the ball radius, that is a ball radius times a selected conformity is ground into the normal radius cavity so as to provide a "groove" 56 with a curvature of a radius $r_s$ in which the balls do not engage the races 30 and 32. The outer limits of the groove 56 form circular high contact areas 58, 60 along which the balls are rolling when the races rotate relative to each other. The circular contact areas are so arranged that, as shown in the cross-section of FIG. 2, the secant lines 62, 64 through the contact areas intersect at the bearing axis 52 at a common point 50. Each ball will then roll between the two races 30, 32 with two contacts for each race and no creep in the contact areas.

Figure 3:
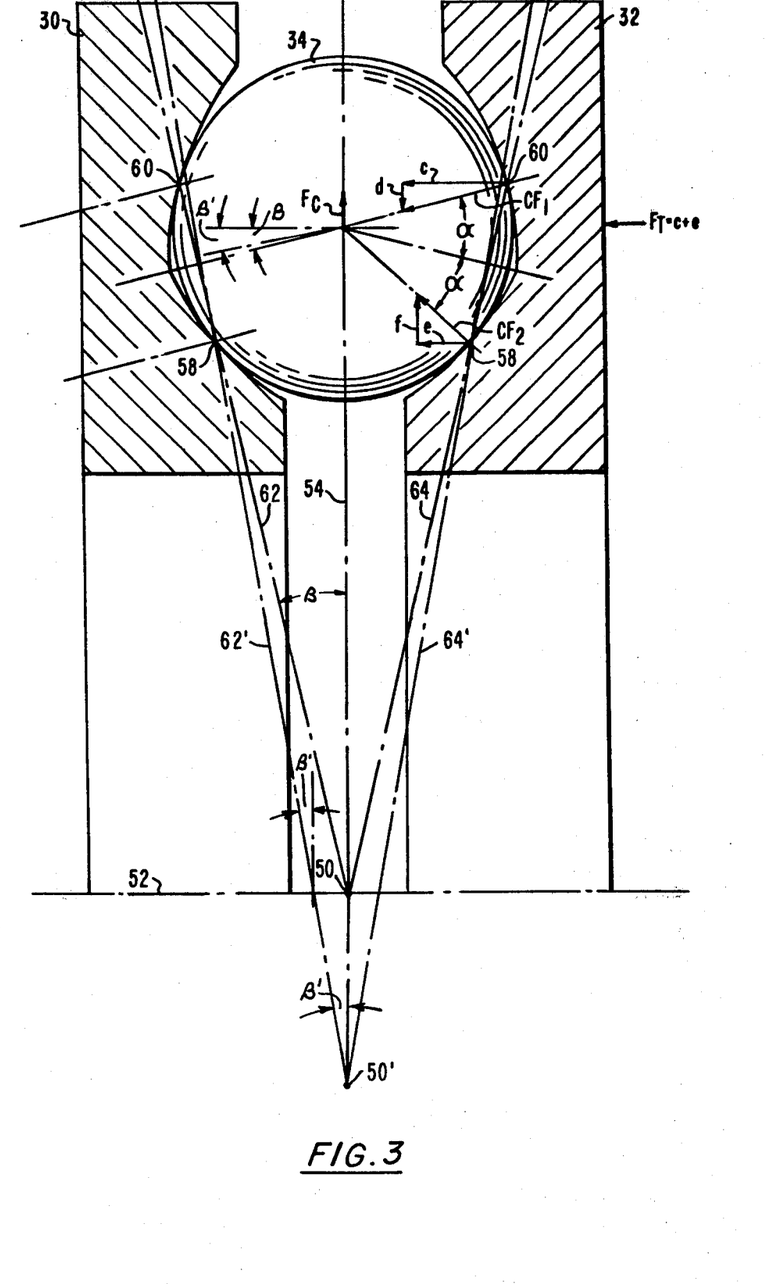
FIG. 3 shows in principle, another embodiment of the invention, both in connection with an axial thrust bearing.

FIG. 3 shows an arrangement in which the surfaces of the races 30 and 32 are ground each with two surface areas with radii of curvature larger than the ball radius of the axial thrust bearing of FIG. 1. Like in FIG. 2, the cones 62 and 64 defined by the circles of contact 58 and 60 of the races 30 and 32 with the balls 34 have a common apex 50 on the bearing axis 52.

If an axial thrust load is applied to such a bearing the thrust force carried by each ball will be divided into two smaller forces, one for each of the contact areas. The force $F_T$ applied to each ball is c+e which generate contact forces $CF_1$ and $CF_2$ normal to the ball surfaces and forces d and f in radial direction with respect to axis 52. During operation there is also a centrifugal force Fc. If the ball is to remain in contact with the race also at the inner ring contact areas the radial outward forces must never be larger than the inward forces:

$$Fc + 2f < 2d$$

$$(Fc/2) + f < d$$

It is seen that even if f becomes 0, d still needs to be larger than Fc/2 in order to provide some contact force at the inner contact areas, that is there must always be a minimum thrust load in order to avoid spin at the inner race. It may be noted at this point that, if an axial thrust load is always provided, sufficient radial support is provided by the axial thrust bearing such that there is no need for a radial support structure (cage) for the rollers.

A series of tests in which the angle α as given in FIGS. 2 and 3 was varied over a wide range shows that bearing life is highest when the two angled contact surface areas are so formed that the angle α, that is one half the ball radii angle between the inner and outer contact circles 58 and 60, is so chosen as to provide for about equal contact pressures on the inner and outer contact areas. For an axial thrust bearing it was found to be the best compromise to choose for α an angle of 18°–22°. Preferably α is in the range of 18°–20°. Bearings with these α angles have performed very well in actual tests with no breakdowns. Computer tests indicate that, with the bearing structure according to the present invention, losses are reduced by 25% and the bearing life is increased 30-fold!

Figure 5:
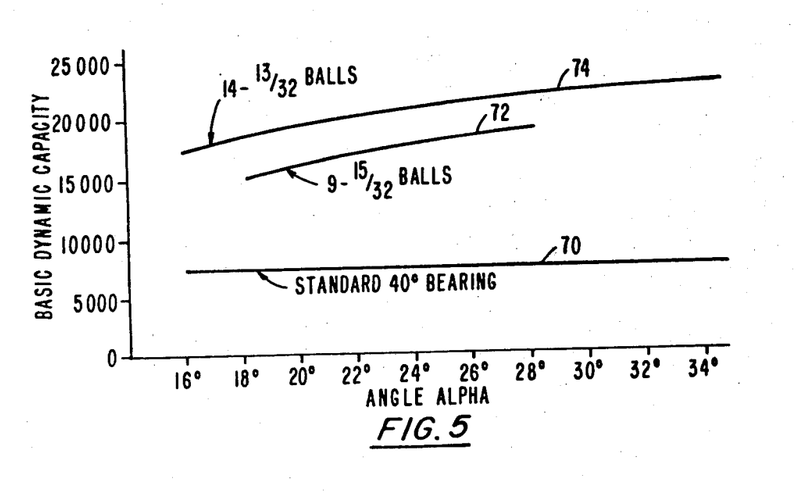
FIGS. 5 to 12 are graphs showing test results for the bearing according to the invention.

FIG. 5 gives comparison values between a standard 40° angle bearing and ball bearings according to the present invention, one with 9 balls of 15/32 inch diameter, the other with 14 balls of 13/32 inch diameter. The basic dynamic load capacity of the standard bearing which has also 9 balls of 15/32 inch diameter at a 1:1 transmission ratio (used in connection with the transmission described in application Ser. No. 168,521) is 7,300 lb. This value is given in FIG. 5 as line 70 for comparison. The basic dynamic capacity for a bearing with the same number of balls of the same size depends on the α angle and is given by line 72. The corresponding values for a bearing with smaller but a larger number of balls (14 balls of 13/32 inch diameter) is given by line 74. Line 74 extends further because the balls are smaller and as a result the angle β (the angle between the ball-race contact lines in an axial plane as shown in FIGS. 2, 3) is smaller.

Figure 6:
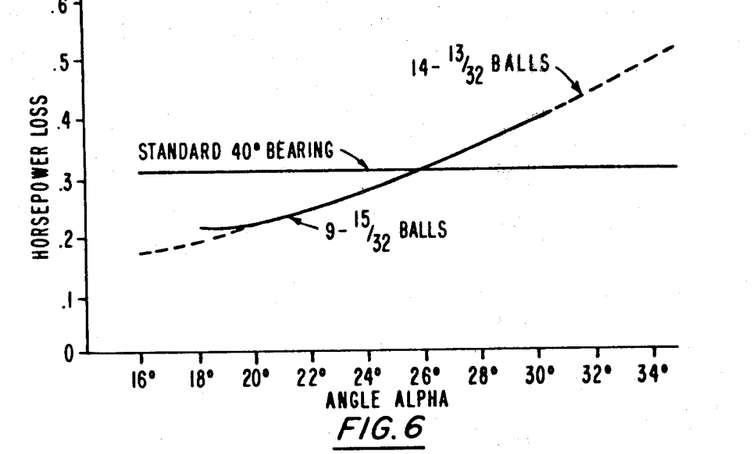

FIG. 6 shows losses of the bearing according to the invention as compared with the standard bearing. It can be seen that with increasing α the losses increase; at about 26° the losses become larger than standard bearing losses.

Figure 7:
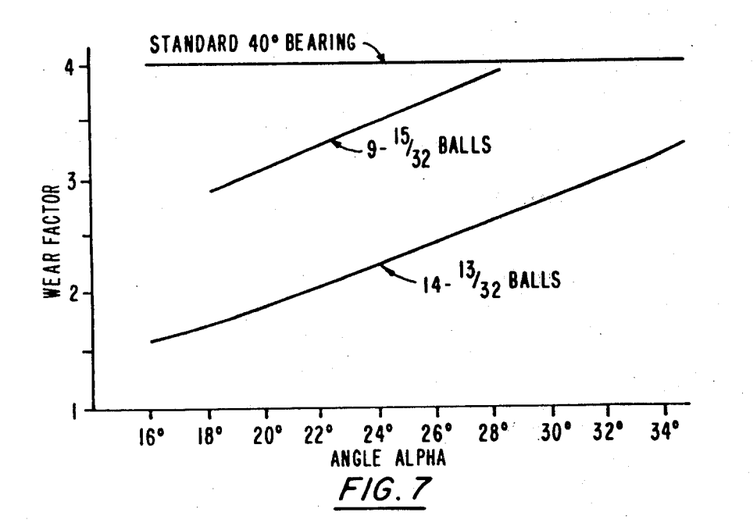

FIG. 7 gives a comparison of bearing wear between a standard bearing and bearings according to the invention. It can be seen that wear is substantially reduced.

Figure 8:
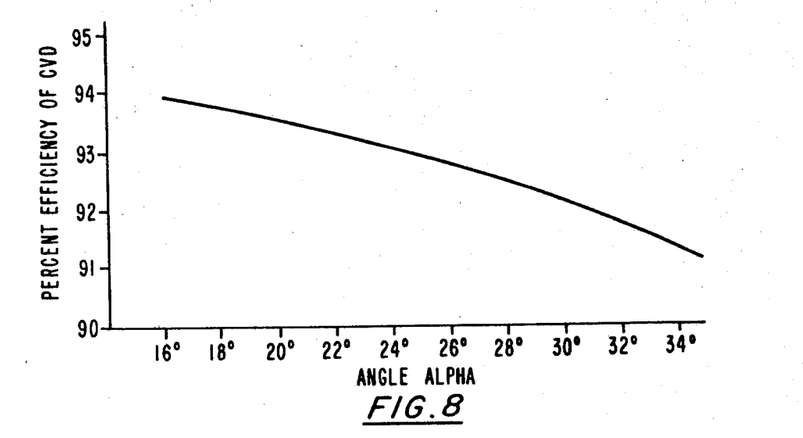

FIG. 8 shows the efficiency of a traction roller transmission depending on the α angle and it can be seen that the efficiency increases with decreasing α angle.

Figure 9:
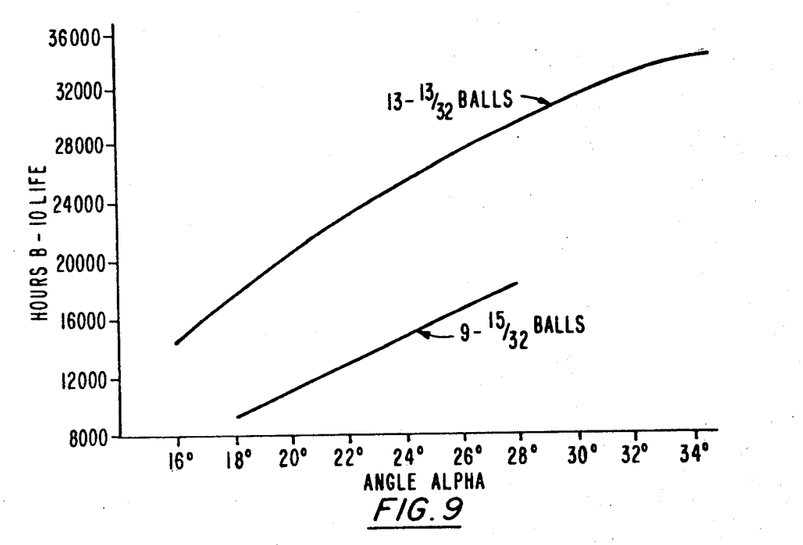

Finally, FIG. 9 shows bearing life depending on angle α.

Careful consideration of the values obtained in the various tests leads the inventor to select as critical limits for the α values 16°–26°. The lower limit is based on the fact that inaccuracies in manufacturing are inevitable and it would become very dangerous to actually have a somewhat lower α angle as, for small α angles loss of frictional contact at the inner contact circle is easily possible resulting in large wear.

The upper limit of 26° was chosen by the inventor since standard ball bearings have evolved over a long time and they are the result of much experience. It would be dangerous and unwise to exceed their losses even if bearing life would be increased.

Preferably, α values are selected to be between 18° and 22°.

In a series of additional high-speed tests of bearings of the type described herein it was found surprisingly, that high-speed bearing life can be increased substantially if the angle β, that is the angle between the ball-race contact lines in an axial plane of the bearing, is smaller than the value it would assume under the ideal condition under which the contact lines intersect on the bearing axis.

Figure 10:
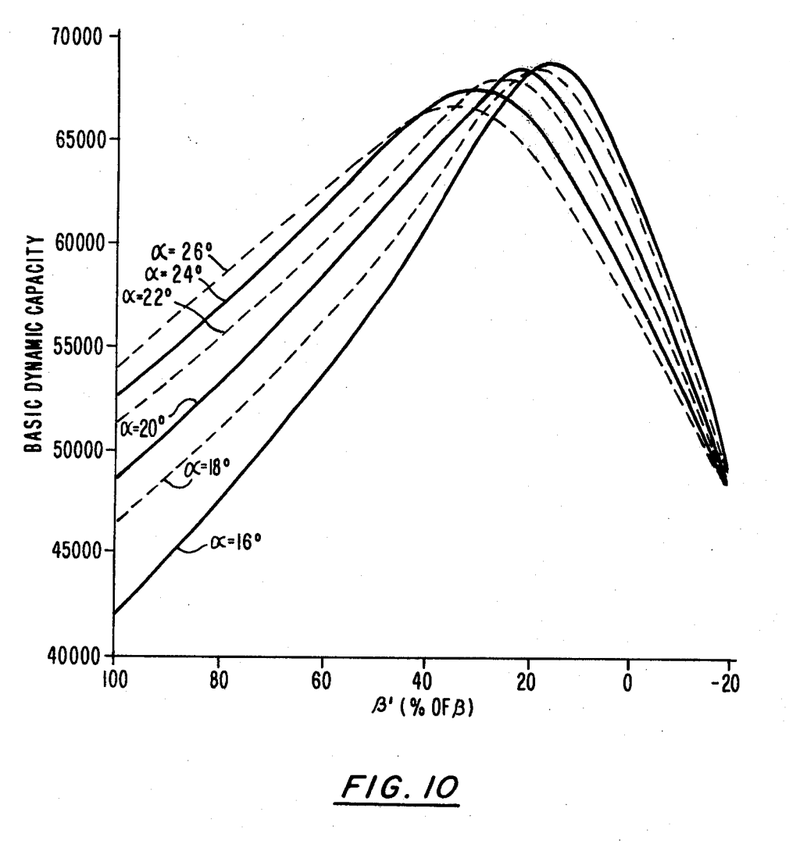

As shown in FIG. 3 β' is somewhat smaller than β so that the secant lines 62' and 64' do not intersect on the axis 52 but at a point 50' spaced from point 50. The distance depends on the value of β' as compared to β and may be expressed. FIG. 10 is a graph showing the basic dynamic capacity (BDC) of a 4-contact ball bearing with 13 balls of 13/16" diameter and an outer ball to race conformity of 0.96 and an inner ball to race conformity of 0.966 for various α values in dependence of β' at a speed of 2800 rpm and a bearing load of 7000 lb. It can be seen from FIG. 10 that a maximum is reached in the area of β'=20–40% of β with the larger α values requiring β' values of somewhat closer conformity with the ideal β value. For a value between 18 and 24 however, there is a definite optimum in the area of β'=40–20% of β.

Figure 11:
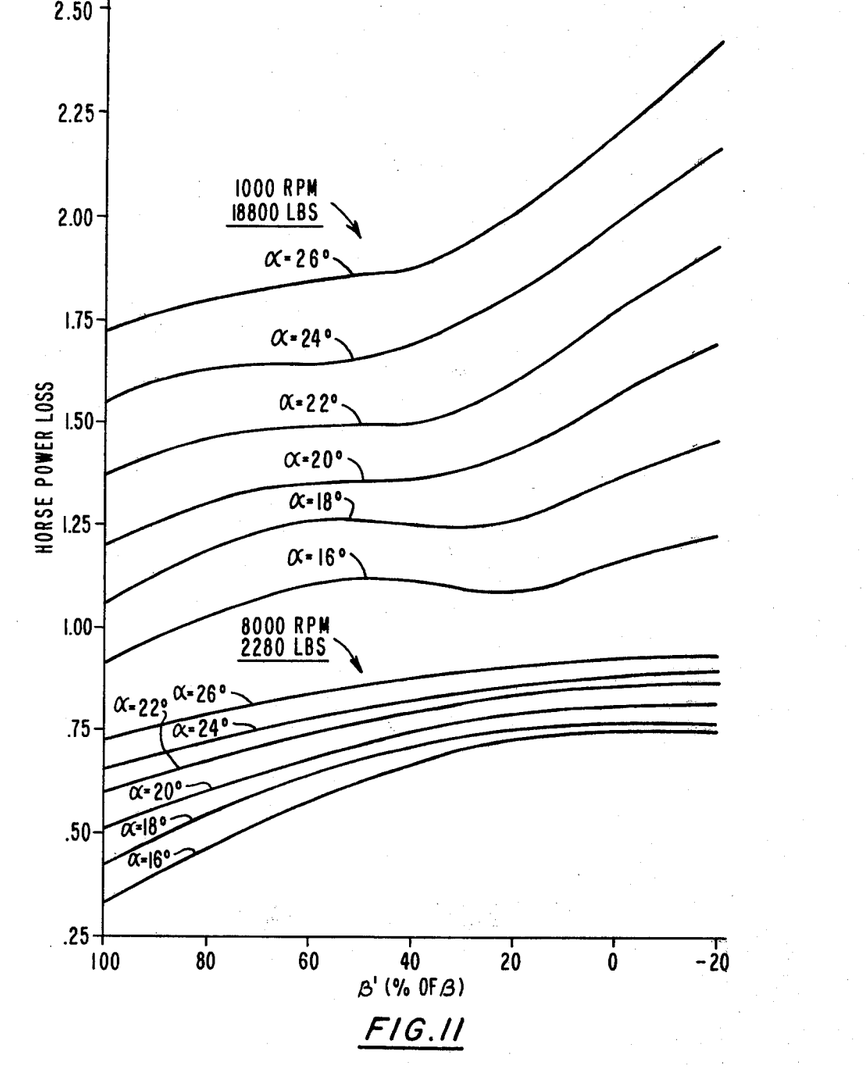
Figure 12:
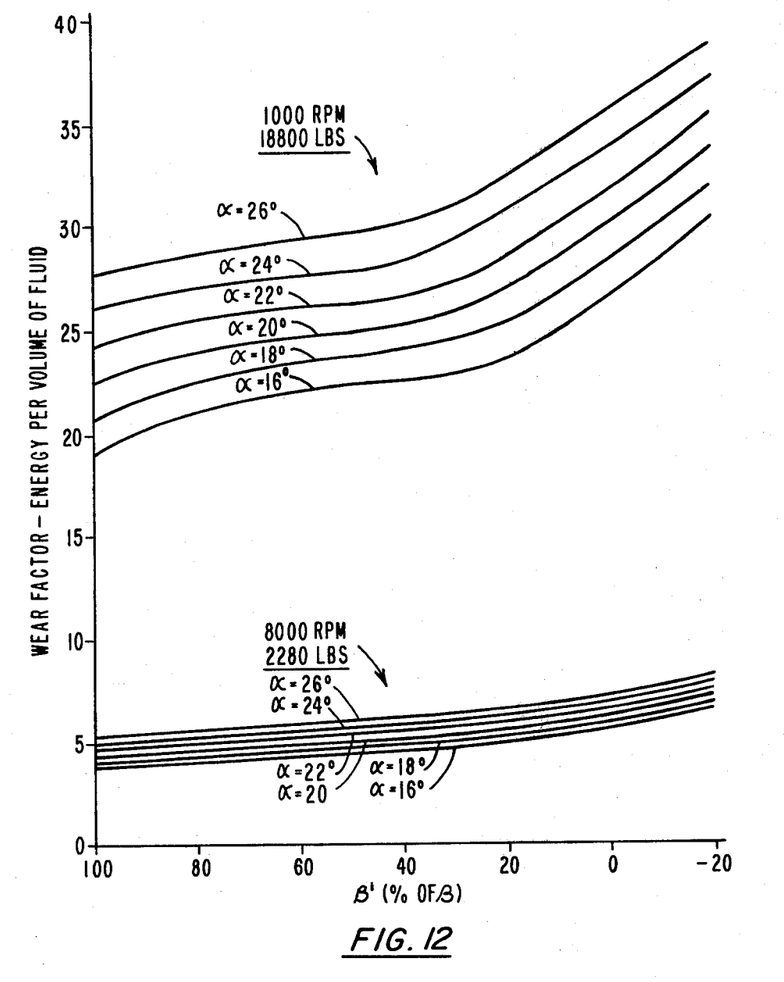

FIGS. 11 and 12 show losses and wear for the same bearing at different transmission ratios, that is at different loads and speeds as used in a variable speed transmission. Again, it will be noted that losses begin to rise substantially between $\beta'=40$ and 20% of $\beta$ and furthermore that wear begins to increase substantially between $\beta'$ and 40–20% of $\beta$.

FIG. 3 shows the bearing wear which is proportional to the energy developed by creep in the ball contact areas divided by the volume of fluid per time interval passing through the contact area to carry the heat away.

As a result it is apparent that a superior bearing will be obtained if the bearing races of a 4-contact bearing are so arranged that $\beta'$ is between 40 and 20% of the ideal $\beta$ value at which the secants through the ball-and-race contact points intersect on the bearing axis.

Bearings of the type described are quite efficient. They have low operating losses and a long life and they are not more difficult to manufacture than normal bearings.

What is claimed is:

1. A high speed axial thrust bearing comprising two race rings with opposed race surfaces forming a bearing cavity therebetween, and bearing balls disposed within said cavity so as to rotatably support said race rings relative to each other, said race rings each having two races each with two circular contact areas with said rollers for supporting said rollers, said races being so arranged that secants through the ball and race contact points form an angle $\beta'$ with a plane normal to the bearing axis which angle $\beta'$ is between 40% and 20% of the ideal angle $\beta$ at which the secants intersect on the bearing axis.

2. An axial thrust bearing as recited in claim 1, wherein an angle $\alpha$ which is half the angle between the connecting lines of the center of a bearing ball and the two points of contact of the bearing ball with one of the race rings is between 16° and 26°.

3. A bearing as recited in claim 2, wherein said angle $\alpha$ is 18°–22°.

4. A bearing as recited in claim 1 or 2, wherein said race surfaces are formed by an annular cavity in the race rings which annular cavity, in cross-section, has a radius of basic curvature larger than the radius of the balls of said bearing and an annular recess in said annular cavity, said annular recess having, in cross-section, a curvature with a radius smaller than that of said balls so as to form said contact areas at the limits of said annular recess.

5. A bearing as recited in claim 1 or 2, wherein said race surface is formed by an annular cavity in the race rings which annular cavity in at least one of the race rings is defined by two annular surface areas disposed at an angle with respect to each other and each having, in cross-section, a radius of curvature larger than the radius of said ball, such that an annular recess is formed at the juncture of said surfaces, said balls contacting both annular surface areas.

* * * * *